United States Patent
Zinnkann et al.

(10) Patent No.: US 6,416,141 B1
(45) Date of Patent: Jul. 9, 2002

(54) METHODS FOR IMPROVING BRAKING PERFORMANCE IN ELECTRONICALLY-CONTROLLED HYDRAULIC BRAKE SYSTEMS

(75) Inventors: Ulrich K. Zinnkann, Vallendar (DE); Patrick H. Hool, St. Clair, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/512,716

(22) Filed: Feb. 24, 2000

Related U.S. Application Data

(60) Provisional application No. 60/121,578, filed on Feb. 25, 1999.

(51) Int. Cl.[7] ............................................. B60T 8/32
(52) U.S. Cl. ................................ 303/191; 303/DIG. 10
(58) Field of Search ...................... 303/191, DIG. 10, 303/119.3, 119.2

(56) References Cited

U.S. PATENT DOCUMENTS

| | | | |
|---|---|---|---|
| 4,566,805 A | * 1/1986 | Klein et al. | 188/1.11 |
| 5,251,440 A | * 10/1993 | Bong-dong et al. | 60/329 |
| 5,253,470 A | * 10/1993 | Newton | 60/39.08 |
| 5,410,878 A | * 5/1995 | Lee et al. | 60/327 |
| 5,600,954 A | * 2/1997 | Bay et al. | 60/454 |
| 5,636,907 A | * 6/1997 | Okazaki et al. | 303/10 |
| 5,971,503 A | * 10/1999 | Joyce et al. | 303/191 |
| 6,019,437 A | * 2/2000 | Barron et al. | 303/113.1 |
| 6,145,939 A | * 11/2000 | Chang et al. | 303/3 |

FOREIGN PATENT DOCUMENTS

| | | |
|---|---|---|
| DE | 19721549 A1 * | 11/1998 |
| DE | 19754163 | 4/1999 |
| DE | 19902033 A1 * | 3/2000 |
| DE | 19920171 | 8/2000 |
| EP | 0342489 A1 * | 5/1989 |
| GB | 2287321 A * | 9/1995 |
| WO | WO 99/16651 | 4/1999 |
| WO | WO 00/46089 | 8/2000 |

* cited by examiner

Primary Examiner—Paul N. Dickson
Assistant Examiner—Robert A. Siconolfi
(74) Attorney, Agent, or Firm—MacMillan, Sobanski & Todd, LLC

(57) ABSTRACT

An electronically controlled vehicular hydraulic brake system provides anti-lock braking, traction control, and vehicle stability control. The system includes a hydraulic control unit (HCU) containing control valves and other components in fluid communication with wheel brakes. Low temperatures cause the viscosity of hydraulic fluid to increase. Performance of the braking system can be improved at low temperatures according to methods of this invention. A first preferred method of improving braking performance is to increase the brake fluid temperature inside the HCU. Several examples of methods to increase fluid temperature inside the HCU are presented. A second preferred method of improving braking performance is to preload the wheel brakes with a pressure that does not adversely affect normal driving. Several examples of methods to preload the wheel brakes are presented.

13 Claims, 3 Drawing Sheets

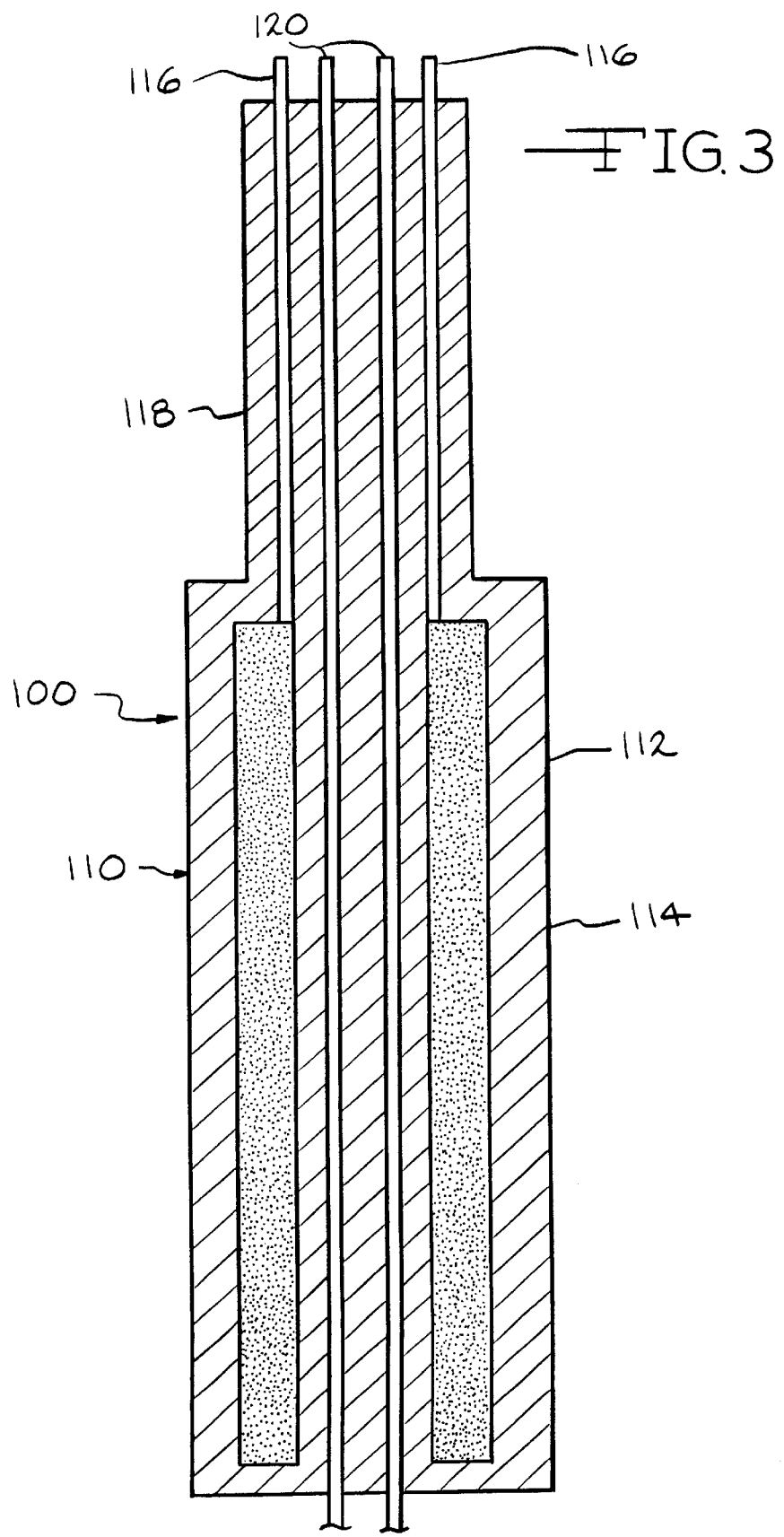

METHODS FOR IMPROVING BRAKING PERFORMANCE IN ELECTRONICALLY-CONTROLLED HYDRAULIC BRAKE SYSTEMS

CROSS REFERENCE TO RELATED APPLICATION

This claims the benefit of U.S. provisional patent application identified as Application Number 60/121,578, filed Feb. 25, 1999.

BACKGROUND OF THE INVENTION

This invention relates in general to vehicular hydraulic brake systems and in particular is concerned with methods to improve braking performance in such systems during low temperature conditions.

Electronically-controlled hydraulic brake systems for vehicles are well known. A typical system includes a master cylinder, fluid conduit arranged into a desired circuit, and wheel brakes. The master cylinder generates hydraulic forces in the circuit by pressurizing brake fluid when the driver steps on the brake pedal. The pressurized fluid travels through the fluid conduit in the circuit to actuate brake cylinders at the wheel brakes and slow the vehicle.

Electronically-controlled hydraulic brake systems also include a hydraulic control unit (HCU) containing control valves and other components located between the master cylinder and the wheel brakes. Through an electronic controller, the control valves, a pump, and other components selectively control pressure to the wheel brakes to provide a desired braking response of the vehicle, including anti-lock braking, traction control, and vehicle stability control.

During anti-lock brake events, a driver is applying a brake pedal and thus pressurizing fluid via a master cylinder. This pressurized fluid is available for re-apply events that selectively permit pressurized fluid to reach the wheel brakes. A pump in the HCU draws fluid from the wheel brakes during a dump cycle and directs fluid to the wheel brakes during a re-apply cycle. Thus, pressurized fluid is available from both the master cylinder and the pump during a re-apply event.

During traction control and vehicle stability control events, a driver is usually not applying a brake pedal and thus the master cylinder does not provide pressurized fluid to the wheel brakes. Instead, the pump in the HCU is activated and provides a sole source of pressurized fluid available to the wheel brakes. A pump inlet can be placed in fluid communication with a fluid reservoir by selectively switching control valves mounted in the HCU.

Performance of the brake system can be adversely affected by various factors, including flow resistance at the inlet side of the pump. Primary sources of resistance on this suction side of the pump include the master cylinder, brake lines from the master cylinder to the HCU and from the HCU to the wheel brakes, and the HCU itself. In particular, the control valves and other components, along with the various fluid passages formed in the HCU, create a significant restriction.

Low temperature can also adversely affect the performance of the brake system. The viscosity of the brake fluid increases as the temperature decreases. High viscosity of the brake fluid at low temperature, particularly at temperatures below –20 C, impacts the ability of a pump to draw fluid. Low temperatures, combined with the above-discussed restrictions, can result in undesirable pump performance.

SUMMARY OF THE INVENTION

This invention includes an electronically-controlled vehicular hydraulic brake system that provides anti-lock braking, traction control, and vehicle stability control. The system includes a hydraulic control unit (HCU) containing control valves and other components in fluid communication with wheel brakes. Low temperatures cause the viscosity of hydraulic fluid to increase. Performance of the braking system can be improved at low temperatures according to methods of this invention.

A first preferred method of improving braking performance is to increase the brake fluid temperature inside the HCU. Several examples of methods to increase fluid temperature inside the HCU are presented.

A second preferred method of improving braking performance is to preload the wheel brakes with a pressure that does not adversely affect normal driving. Several examples of methods to preload the wheel brakes are presented.

Various objects and advantages of this invention will become apparent to those skilled in the art from the following detailed description of the preferred embodiments, when read in light of the accompanying drawings.

BRIEF DESCRIPTION OF THE DRAWINGS

FIG. 3 is an enlarged, sectional view of the heating device of FIG. 2 removed from the hydraulic control unit.

DETAILED DESCRIPTION

Figure 1:
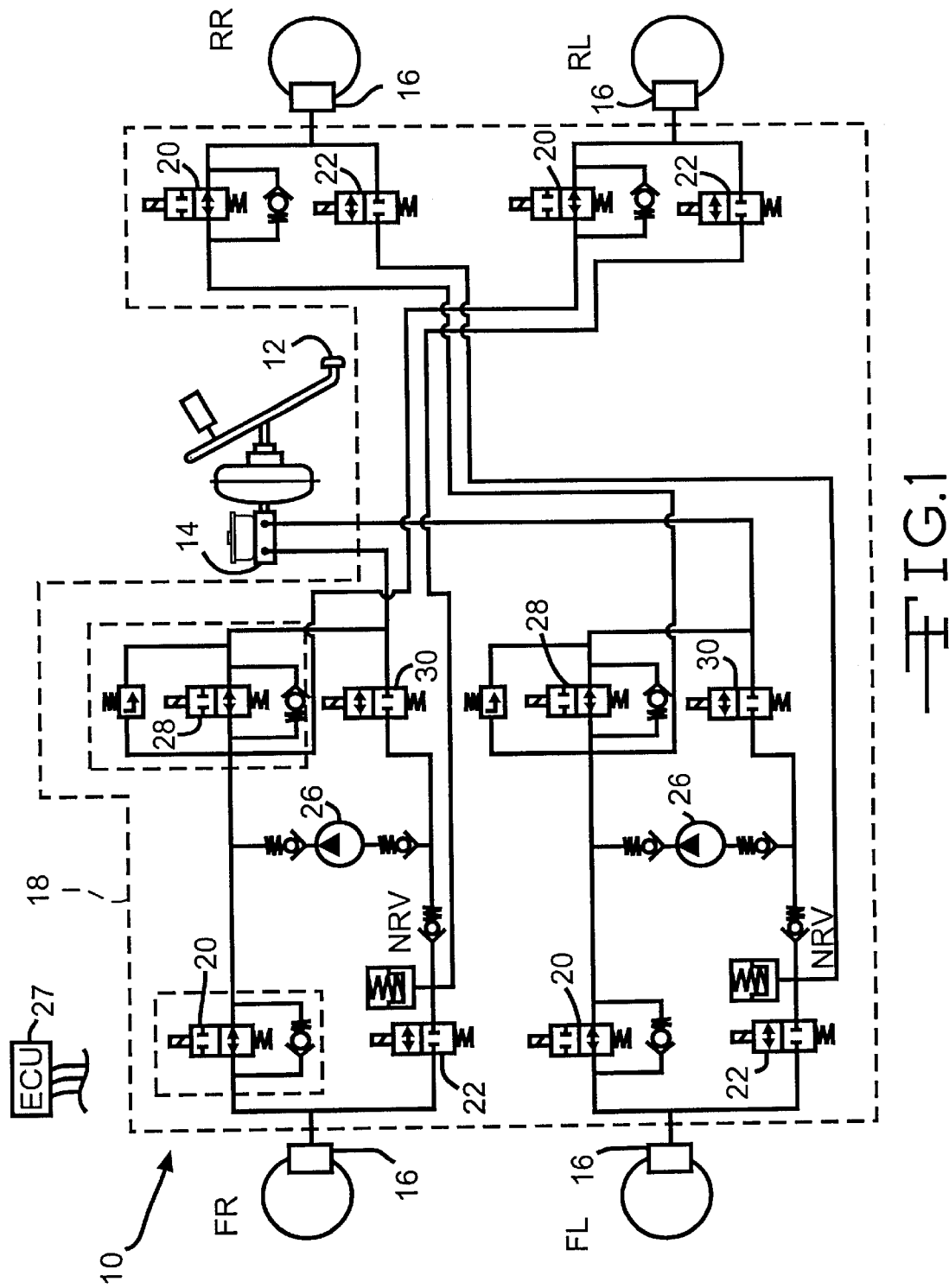
FIG. 1 is a schematic circuit diagram of a vehicular brake system according to this invention.

A vehicular brake system according to this invention is indicated generally at 10 in FIG. 1. System 10 includes valves and other components described below to provide anti-lock braking (ABS), traction control (TC), and vehicle stability control (VSC) functions.

In system 10, a brake pedal 12 is connected to a master cylinder 14 to provide pressurized brake fluid to wheel brakes 16. A hydraulic control unit (HCU) 18 includes a housing having bores for receiving control valves and other components described below. Fluid passageways or conduits are provided between the bores to provide fluid communication between the valves and other components.

The HCU 18 includes normally open control valves 20, commonly referred to as isolation valves, and normally closed control valves 22, commonly known as dump valves, disposed between the master cylinder 14 and the wheel brakes 16. The pumps 26 are driven by an electric motor (not illustrated) in a well known manner.

Each isolation valve 20 is preferably formed as a solenoid valve switchable between two positions. Each dump valve 22 is preferably formed as a solenoid valve switchable between two positions. Valves 20 and 22 include a coil subassembly that creates an electromagnetic flux to slide an internal armature between the two positions. Valves 20 and 22, as well as pumps 26, are electrically connected to an electronic control unit 27 and operated to provide desired anti-lock braking in a well known manner.

The system 10 of FIG. 1 is illustrated as a diagonally split system, wherein the right front wheel and the left rear wheel are included in a circuit, and the left front wheel and the right rear wheel are included in a second circuit. Other configurations of braking system 10 can be provided.

A TC/VSC isolation valve 28 is provided in each circuit. The TC/VSC isolation valves 28 are in fluid communication with the master cylinder 14 and the isolation valves 20.

A supply valve 30 is provided in each circuit. The supply valves 30 are in fluid communication with the master cylinder 14 and an inlet to the pump 26.

Valves 28 and 30 include a coil subassembly that creates an electromagnetic flux to slide an internal armature between two positions. Valves 28 and 30 are electrically connected to an electronic control unit 27 and operated to provide desired anti-lock braking in a well known manner.

By increasing the temperature in the HCU 18, viscosity of the brake fluid can be reduced, thereby improving the performance of the pumps 26, particularly during TC and VSC events.

A first preferred method of improving braking performance of system 10 is to increase the brake fluid temperature inside the HCU 18. The following are examples of methods to increase fluid temperature in the HCU 18:

EXAMPLE 1

Activate some or all of the control valves 20, 22, 28, 30. Control valves 20, 22, 28, 30 are preferably formed as two-position solenoid valves having a coil subassembly. As the coil assembly is energized to produce an electromagnetic field to slide an internal armature, heat is generated in the coil assembly that is transferred to the brake fluid. As the fluid is heated, its viscosity decreases.

EXAMPLE 2

Activate the pumps 26 without activating any control valves 20, 22, 28, 30. As a pump 26 is activated, an internal piston reciprocates to displace fluid. Heat is generated in the brake fluid by fiction as the piston reciprocates.

EXAMPLE 3

Activate the pump 26 and the TC/VSC isolation valves 28 at a pressure lower than the normal operating pressure to reduce noise to produce an internal pressure drop, thus transferring heat directly to the brake fluid. The pump 26 and the valves 28 can be activated simultaneously if desired. The isolation valves 20 are closed to prevent pressure build up at the wheel brakes 16. The supply valves 30 are open.

EXAMPLE 4

Activate the pump 26 and the TC/VSC isolation valves 28 to a pressure higher than the normal operating pressure to produce an internal pressure drop, thus transferring heat directly to the brake fluid. The relatively high setting of the TC/VSC isolation valves 28 will reduce the time to heat the brake fluid. The pump 26 and the valves 28 can be activated simultaneously if desired. The isolation valves 20 are closed to prevent pressure build up in the wheel brakes 16. The supply valves 30 are open.

EXAMPLE 5

Activate the pump 26 and activate the TC/VSC isolation valves 28 to a setting that does not cause recognizable braking effect of a vehicle. The isolation valves 20 are initially open so that some fluid will be stored in the wheel brakes 16. Next, close the isolation valves 20, open the dump valves 22 and set the TC/VSC isolation valve 28 to a relatively high setting. This will return fluid stored in the wheel brakes 16 to the master cylinder 14 at a higher temperature.

EXAMPLE 6

Perform Example 5 two or more times.

EXAMPLE 7

Activate a component in the ECU 27 to produce heat that is conducted to the HCU 18.

EXAMPLE 8

Install a heating device directly into the HCU 18.

Figure 2:
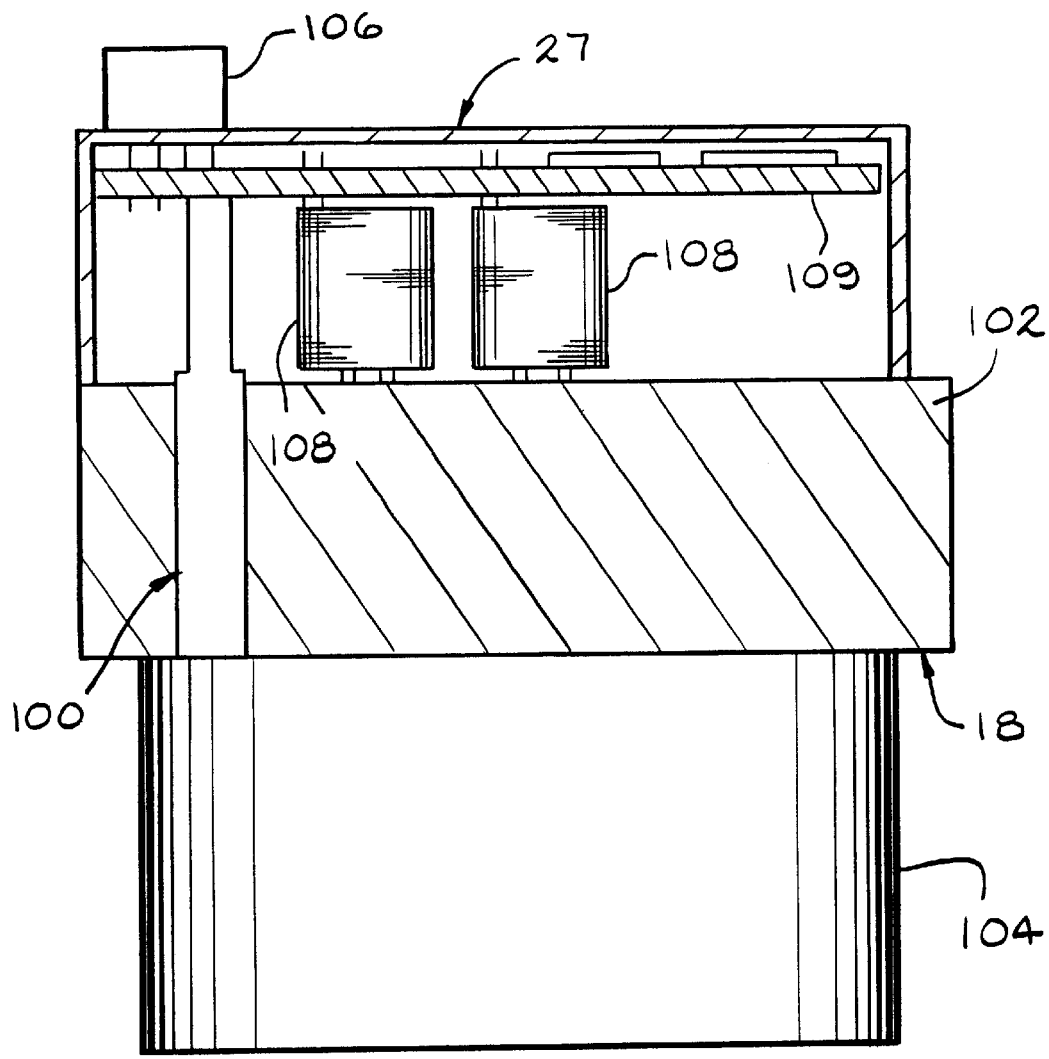
FIG. 2 is a schematic representation of a pancake design of an electronic control unit mounted on one side of a hydraulic control unit and an electric motor mounted on an opposite side of the hydraulic control unit, including a heating device inserted into a bore of the hydraulic control unit and extending between the electronic control unit and the electric motor.

An example of a heating device is indicated generally at 100 in FIGS. 2 and 3. The heating device 100 can be installed in a bore formed through a housing 102 of the HCU 18. As described above, the HCU 18 includes the housing 102 that contains the control valves and other components. Preferably, the housing 102 is formed from aluminum or an aluminum alloy.

An electric motor 104 that drives pumps 26 mounted inside the housing 102 can be mounted on one side of the housing 102. The electronic control module (ECU) 27 can be mounted on an opposite side of the housing 102 to form a "pancake" design. The ECU 27 includes a connector 106 to which current is supplied from a vehicular source, such as a battery. The ECU 27 can also includes coil subassemblies 108 that are fitted over flux tubes of control valves mounted in the housing 102. The heating device 100, connector 106, and coil subassemblies 108 are electrically connected to a device 109 such as a printed circuit board that distributes current from the vehicular source.

An enlarged section view of the heating device 100 is illustrated in FIG. 3. The heating device 100 includes a stepped, cylindrical housing 110. A large diameter portion 112 of the housing 110 is received in the bore of the housing 102 of the HCU 18. An annular heating element 114 is provided in the large diameter portion 112. When current is supplied to the heating element 114, heat is generated that is conducted through housing 1 10 to housing 102 to warm hydraulic fluid contained in the HCU 18.

Connectors 116 extend between the heating element 114 and the device 109 through a small diameter portion 1 18. Connectors 120 extend between the motor 104 and the device 109 through the small diameter portion 118.

The heating device 100 having a heating element 114 can be added to a pancake design with minimal additional cost. Packaging the heating device 100 in the bore of the HCU 18 permits efficient transfer of heat to the hydraulic fluid. No additional assembly procedure is required when the heating element 114 is added to the through-hole connection housing 110 of the pancake design.

EXAMPLE 9

Apply or activate one or more of the above-listed examples only at temperatures below a predetermined temperature.

EXAMPLE 10

Apply or activate one or several of the above-listed examples only at fluid viscosity above a predetermined viscosity. Fluid viscosity can be determined by closing the isolation valves 20 and opening the supply valves 30. If fluid viscosity is suitable low, a high torque on the pump motor will result due to the volumetric efficiency. In the case of high fluid viscosity, high torque will not be generated due to poor suction fill, thus the pump motor will spin faster for a given current. This will indicate that preconditioning of the brake fluid is required so that a heating event will continue either for a predetermined time interval or until the pump motor torque feedback signals that sufficient pump efficiency has been obtained.

A second preferred method of improving braking performance of system 10 is to preload the wheel brakes 16 with a pressure that does not affect normal driving. The following are examples of methods to preload the wheel brakes 16:

EXAMPLE 1

Preload the wheel brakes 16 when expecting an imminent TC or VSC event by activating the pump 26 with a low pressure that will not adversely affect the performance of the vehicle. This will reduce the volume requirement of a TC or VSC event significantly since most of the volume is consumed at very low pressures.

EXAMPLE 2

Preload the wheel brakes 16 when the temperature is below a predetermined limit with a low pressure by activating the pump 26. This will not adversely affect the performance of the vehicle, but will reduce the volume requirement of a TC or VSC event significantly since most of the volume is consumed at very low pressure.

EXAMPLE 3

Preload the wheel brakes 16 of the driven wheels only. This will avoid locking of the wheels on very low mu surfaces.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A control unit for an electronically controlled vehicular braking system comprising:
   a hydraulic control unit having a housing comprising a metallic block, the housing having bores and conduits receiving hydraulic fluid, and the housing further having a bore which is not in fluid communication with the hydraulic fluid;
   a control valve mounted on the housing of the hydraulic control unit;
   a pump mounted on the housing of the hydraulic control unit;
   an electronic control unit mounted to the housing of the hydraulic control unit;
   an electric motor mounted to the housing of the hydraulic control unit;
   a heating device received in the bore in the housing of the hydraulic control unit which is not in fluid communication with the hydraulic fluid, and the heating device electrically connected to the electronic control unit and to the electric motor.

2. The control unit specified in claim 1 wherein the heating device includes a heating element.

3. The control unit specified in claim 2 wherein the heating element is generally annular in shape.

4. The control unit specified in claim 1 wherein the heating device includes connectors for directing current from the electronic control unit to the electric motor.

5. The control unit specified in claim 1 wherein the heating device is disposed relative to the housing of the hydraulic control unit so that heat is conducted from the heating device through the housing of the hydraulic control unit to warm the hydraulic fluid contained therein.

6. A control unit for an electronically controlled vehicular braking system comprising:
   a hydraulic control unit having a housing with bores and conduits receiving hydraulic fluid;
   a control valve mounted on the housing of the hydraulic control unit;
   a pump mounted on the housing of the hydraulic control unit;
   an electronic control unit mounted to the housing of the hydraulic control unit;
   an electric motor mounted to the housing of the hydraulic control unit; and
   a heating device mounted directly to the housing of the hydraulic control unit independent of the control valve and not in fluid communication with the hydraulic fluid, the heating device being electrically connected to the electronic control unit and to the electric motor.

7. The control unit specified in claim 6 wherein the heating device includes a heating element.

8. The control unit specified in claim 7 wherein the heating element is generally annular in shape.

9. The control unit specified in claim 6 wherein the heating device includes connectors for directing current from the electronic control unit to the electric motor.

10. The control unit specified in claim 6 wherein the heating device is disposed in the housing of the hydraulic control unit so that heat is conducted. from the heating device directly through the housing of the hydraulic control unit to warm the hydraulic fluid contained therein.

11. A control unit for an electronically controlled vehicular braking system comprising:
    a hydraulic control unit having a housing defining a conduit therein adapted to be connected in fluid communication with a hydraulic brake line of a motor vehicle braking system;
    a control valve mounted on the hydraulic control unit in fluid communication with the conduit for controlling the flow of hydraulic fluid therethrough; and
    a heater fixed to the housing for directly heating the housing and any hydraulic fluid contained therein.

12. The control unit of claim 11 further including an electronic control unit for controlling the operation of the control valve and of the heater.

13. A control unit for an electronically controlled vehicular braking system comprising:
    a hydraulic control unit defining a conduit therein adapted to be connected in fluid communication with a hydraulic brake line of a motor vehicle braking system;
    a control valve mounted on the hydraulic control unit in fluid communication with the conduit for controlling the flow of hydraulic fluid therethrough; and
    a heater fixed to the hydraulic control unit for selectively heating the hydraulic control unit and any hydraulic fluid contained therein, wherein the heater is disposed in a cavity defined within the hydraulic control unit, the cavity not being in fluid communication with the conduit so that the heater is isolated from any hydraulic fluid which might be contained in the hydraulic control unit.

* * * * *